(12) United States Patent
Miller

(10) Patent No.: US 10,759,534 B2
(45) Date of Patent: Sep. 1, 2020

(54) METHOD AND SYSTEM FROM CONTROLLING AN UNMANNED AERIAL VEHICLE

(71) Applicant: George A. Miller, Dallas, TX (US)

(72) Inventor: George A. Miller, Dallas, TX (US)

( * ) Notice: Subject to any disclaimer, the term of this patent is extended or adjusted under 35 U.S.C. 154(b) by 38 days.

(21) Appl. No.: 16/176,644

(22) Filed: Oct. 31, 2018

(65) Prior Publication Data

US 2019/0061942 A1 Feb. 28, 2019

Related U.S. Application Data

(63) Continuation-in-part of application No. 15/933,107, filed on Mar. 22, 2018, now abandoned.

(60) Provisional application No. 62/528,397, filed on Jul. 3, 2017.

(51) Int. Cl.
*B64C 39/02* (2006.01)
*G05D 1/00* (2006.01)
*G05D 1/10* (2006.01)
*G08G 5/00* (2006.01)
*B64D 47/08* (2006.01)
*G06K 9/00* (2006.01)

(52) U.S. Cl.
CPC ............ *B64C 39/024* (2013.01); *B64D 47/08* (2013.01); *G05D 1/0022* (2013.01); *G05D 1/0061* (2013.01); *G05D 1/0088* (2013.01); *G05D 1/101* (2013.01); *G06K 9/0063* (2013.01); *G08G 5/006* (2013.01); *G08G 5/0013* (2013.01); *G08G 5/0026* (2013.01); *G08G 5/0039* (2013.01); *G08G 5/0069* (2013.01); *G08G 5/0078* (2013.01); *G08G 5/0091* (2013.01); *B64C 2201/141* (2013.01); *B64C 2201/146* (2013.01)

(58) Field of Classification Search
CPC ...... B60Q 1/50; G05D 1/0088; G05D 1/0011; G05D 1/0061; G07C 5/08; G07C 5/0841; G07C 5/085; G07C 5/024; B64C 39/024; B64C 2201/146; B64C 2201/141; B64C 2201/145; B64C 2201/027; G08G 5/0013; G08G 5/006; G08G 5/0039; G08G 5/0069
See application file for complete search history.

(56) References Cited

U.S. PATENT DOCUMENTS

| | | |
|---|---|---|
| 8,983,682 B1 * | 3/2015 | Peeters .............. B64C 39/024 244/190 |
| 9,070,101 B2 | 6/2015 | Abhyanker |
| 9,262,929 B1 | 2/2016 | Roy et al. |
| 9,307,383 B1 | 4/2016 | Patrick |
| 9,359,074 B2 | 6/2016 | Ganesh et al. |
| 9,373,014 B1 | 6/2016 | Mehranfar |
| 9,373,149 B2 | 6/2016 | Abhyanker |
| 9,451,020 B2 | 9/2016 | Liu et al. |

(Continued)

*Primary Examiner* — Michael J Zanelli
(74) *Attorney, Agent, or Firm* — John J. Patti; Patti Pershern, PLLC

(57) ABSTRACT

A method is provided. An unmanned aerial vehicle (UAV) can be operated in an autonomous mode, performing course corrections from sensor data using an object detection processor and a decision processor. The UAV can then enter a hover mode if an override condition is present and enter a remote-control mode once the UAV is in the hover mode. In the remote-control mode, flight control commands can be received via the cellular module so as to position the UAV in response to the flight control command.

16 Claims, 6 Drawing Sheets

(56) References Cited

U.S. PATENT DOCUMENTS

| | | |
|---|---|---|
| 9,479,392 B2 | 10/2016 | Anderson et al. |
| 9,493,238 B2 | 11/2016 | Takayama et al. |
| 9,535,423 B1 | 1/2017 | Debreczeni |
| 9,547,307 B1 | 1/2017 | Cullinane et al. |
| 9,592,911 B2 * | 3/2017 | Liu .................... B64C 39/024 |
| 9,612,123 B1 | 4/2017 | Levinson et al. |
| 9,630,715 B2 | 4/2017 | Takayama et al. |
| 9,631,933 B1 | 4/2017 | Aula et al. |
| 9,669,904 B2 | 6/2017 | Hanson et al. |
| 9,671,781 B1 | 6/2017 | Peeters et al. |
| 9,720,415 B2 | 8/2017 | Levinson et al. |
| 9,734,723 B1 | 8/2017 | Bruno et al. |
| 9,743,260 B2 | 8/2017 | Wilson et al. |
| 9,754,490 B2 | 9/2017 | Kentley et al. |
| 9,817,396 B1 * | 11/2017 | Takayama ............ G05D 1/0038 |
| 9,910,441 B2 | 3/2018 | Levinson et al. |
| 9,958,864 B2 | 5/2018 | Kentley-Klay et al. |
| 9,983,582 B2 | 5/2018 | Nemec et al. |
| 9,987,971 B2 | 6/2018 | Gordon et al. |
| 10,000,285 B2 | 6/2018 | Shannon et al. |
| 10,048,683 B2 | 8/2018 | Levinson et al. |
| 2012/0083945 A1 * | 4/2012 | Oakley .................. B64C 27/08 |
| | | 701/2 |

* cited by examiner

| Transaction No. | Drone ID | GPS Location | Timestamp | Nonce | Top Hash | Previous Block | Current Block |
|---|---|---|---|---|---|---|---|
| # | # | # | # | # | # | # | # |

*FIG. 5*

METHOD AND SYSTEM FROM CONTROLLING AN UNMANNED AERIAL VEHICLE

CROSS-REFERENCE TO RELATED APPLICATIONS

This application is a continuation-in-part of U.S. patent application Ser. No. 15/933,107, which entitled "System for Communicating Mode of a Vehicle" and which was filed on Mar. 22, 2018 and which claims priority to U.S. patent application Ser. No. 62/528,397 that was filed on Jul. 3, 2017. Each application is hereby incorporated by reference for all purposes.

TECHNICAL FIELD

The invention relates generally to unmanned serial vehicle (UAV) or drone and, more particularly, to control of a drone.

BACKGROUND

Over the last few years, drones have become more widely used in a variety of applications ranging from reconnaissance to delivery of supplies. As a result, drones have been incrementally improving and are on the verge of being in wide spread use. But, widespread usage of drones—especially in urban areas—can be problematic. Namely, the drones can pose a danger to public safety due to (for example) entering prohibited areas (like power substations), airborne collisions, or poor weather conditions. Therefore, there is a need for overriding drone controls to help ensure public safety. Some examples of conventional drone controls and designs can be seen in the following: U.S. Pat. Nos. 9,070,101; 9,262,929; 9,307,383; 9,359,074; 9,373,014; 9,373,149; 9,451,020; 9,479,392; 9,493,238; 9,535,423; 9,547,307; 9,612,123; 9,630,715; 9,631,933; 9,669,904; 9,671,781; 9,720,415; 9,734,723; 9,743,260; 9,754,490; 9,910,441; 9,958,864; 9,983,582; 9,987,971; 10,000,285; 10,048,683.

SUMMARY

An embodiment of the present disclosure, accordingly, a method is provided. The method comprises: operating an unmanned aerial vehicle (UAV) in an autonomous mode, wherein the step of operating the UAV includes: operating a visual indicator in a first mode, wherein the first mode reflects that the UAV is in the autonomous mode; receiving a first set of sensor data from a sensor by a main controller having an object detection processor, and a decision processor; analyzing the first set of sensor data to detect a location of a first object by the object detection processor; and determining a course adjustment by the decision processor based at least in part on the location of the first object; entering a hover mode if an override condition is present, wherein the step of entering the hover mode includes: operating the visual indicator in a second mode, wherein the second mode reflects that the UAV is in the hover mode; receiving a second set of sensor data from the sensor by the main controller; analyzing the second set of sensor data to detect a location of a second object by the object detection processor; and determining, by the decision processor, a distance from the second from which the UAV is to hover, wherein the distance is based at least in part on the location of the second object; entering a remote-control mode once the UAV is in the hover mode, wherein the step of entering the hover mode includes: operating the visual indicator in a third mode, wherein the second mode reflects that the UAV is in the remote-control mode; receiving a third set of sensor data from the sensor by the main controller; transmitting the third set of sensor data via a cellular module that is in communication with the main controller; receiving a flight control command via the cellular module; and positioning the UAV in response to the flight control command.

In accordance with an embodiment of the present disclosure, the first object further comprises a plurality of first objects, and wherein the second object further comprises a plurality of second objects, and wherein the flight control command further comprises a plurality of flight control commands.

In accordance with an embodiment of the present disclosure, the sensor further comprises a plurality of sensors.

In accordance with an embodiment of the present disclosure, the plurality of sensors further comprises a camera and an accelerometer.

In accordance with an embodiment of the present disclosure, the course adjustment is a first course adjustment wherein the step of operating the UAV further comprises: determining a position of the UAV with a global positioning system (GPS) module that is in communication with the main controller; comparing the position of the UAV with a predetermined course to generate error data; and determining a second course correction in response to the error data.

In accordance with an embodiment of the present disclosure, the method further comprises: determining a position of the UAV with a GPS module that is in communication with the main controller; receiving a timestamp by the cellular module; generating a nonce; generating a top hash based at least in part on the timestamp and the position of the UAV; calculating a current block based at least in parat on a previous block, the top hash, and nonce; and transmitting, via the cellular module, the current block, the timestamp, the nonce, the prior block, and the position of the UAV.

In accordance with an embodiment of the present disclosure, the first, second, and third modes are represented by different colors.

In accordance with an embodiment of the present disclosure, the first, second, and third modes are represented by different strobing patters.

In accordance with an embodiment of the present disclosure. A UAV is provided. The UAV comprises: a lift body having: a first housing; a motor with a stator and a rotor, wherein the stator of the motor is secured to the first housing; a propeller that is secured to the rotor of the motor; a main body having: a second housing that is secured to the first housing and that has an interior; a visual indicator secured to the second housing; avionics secured at least partially within the interior of the second housing, wherein the avionics includes: a camera; a GPS module; a cellular module; an accelerometer; a power supply that is configured to provide power to the motor, the camera, the cellular module, visual indicator, and the accelerometer, a main controller having an object detection processor, a decision processor, and memory, wherein the main controller is configured to receive power from the power supply, and wherein the main controller is operable to communicate with the camera, the cellular module, visual indicator, and the accelerometer, and wherein the memory includes instructions to: operate a visual indicator to reflect that the UAV is in an autonomous mode; analyze a first set of sensor data received from the camera to detect a location of a first object with the object detection processor during the autonomous mode; determine a course adjustment with the decision processor based at least in part on the location of the first objet during the autonomous mode; operate the visual indicator to reflect that the UAV is in a hover mode when an override condition is present; analyze a second set of sensor data received from the camera to detect a location of a second object with the object detection processor; determine, with the decision processor, a distance from the second from which the UAV is to hover, wherein the distance is based at least in part on the location of the second object; operate the visual indicator to reflect that the UAV is in the remote-control mode; transmit the third set of sensor data received from the camera via the cellular module; and position the UAV in response to a flight control command received via the cellular module.

In accordance with an embodiment of the present disclosure, the camera further comprises a visual spectrum camera and an infrared camera.

In accordance with an embodiment of the present discloser, the avionics further comprises a forward looking millimeter wave (mmW) radar transceiver, and a downward-looking mmW radar transceiver, and wherein the first, second, and third sets of sensor data include measurements from the forward-looking and downward-looking mmW radar transceivers.

In accordance with an embodiment of the present disclosure, the avionics further comprises an airspeed sensor and a barometer, and wherein, for the instructions to determine the course adjustment, the course adjustment is at least in part based on airspeed.

In accordance with an embodiment of the present disclosure, the avionics further comprises impact sensors that are configured to be powered by the power supply and that is in communication with the main controller.

In accordance with an embodiment of the present disclosure, the visual indicator is a plurality of LEDs, and wherein the first, second, and third modes are represented by different colors.

In accordance with an embodiment of the present disclosure, the first housing further comprises a plurality of first housings, and wherein the motor further comprises a plurality of motors, with the stators of each secured at least of the first housings, and wherein the propeller further comprises a plurality of propellers with each secured to at least one rotor of at least one of the motors.

In accordance with an embodiment of the present disclosure, a UAV is provided. The UAV comprises: a lift body having: a plurality of arms; a plurality of motors, wherein each motor has a stator and a rotor, an wherein the stator of each motor is secure to at least one of the arms: a plurality of propellers, wherein each propeller is secured to at least one rotor of at least one of the motors; a main housing having an interior, a top surface, and a bottom surface, wherein each first arm is secured to the main housing; a power supple secured within the interior of the main body housing, wherein the power supply includes: a battery; and a power supply manager that is electrically coupled to the battery; a motor manager that is secured with the interior of the main body and that is electrically coupled to the power supply and each motor; a plurality of visual indicators that are secured to the main housing such that each visual indicator is visible from the top surface of the main housing; a camera that is secured to the bottom surface of the main housing and that is electrically coupled to the power supply: a mmW radar transceiver secured to the main housing and that is electrically coupled to the power supply; a GPS module secured to the main housing an that is electrically coupled to the power supply; an accelerometer that is secured to the main housing and that is electrically coupled to the power supply: a cellular module that is secured to the main housing and that is electrically coupled to the power supply; and a main controller that is secured within the interior of the main housing, wherein the main controller includes: a bus; an object detection processor that is electrically coupled to the bus; a decision processor that is electrically coupled to the bus; an interface that is electrically coupled to the bus, wherein the interface is electrically coupled to the camera, mmW radar transceiver, GPS module, accelerometer, and cellular module; and memory that is electrically coupled to the bus, wherein the memory includes instructions to: operate the visual indicators to reflect that the UAV is in an autonomous mode: analyze a first set of sensor data received from the camera and mmW radar transceiver to detect a location of a first object with the object detection processor during the autonomous mode, determine a course adjustment with the decision processor based at least in part on the location of the first object during the autonomous mode; operate the visual indicators to reflect that the UAV is in a hover mode when an override condition is present, analyze a second set of sensor data received from the camera and mmW radar transceiver to detect a location of a second object with the object detection processor; determine, with the decision processor, a distance from the second from which the UAV is to hover, wherein the distance is based at least in part on the location of the second object; operate the visual indicator to reflect that the UAV is in the remote-control mode; transmit the third set of sensor data received from the camera via the cellular module; and position the UAV in response to a flight control command received via the cellular module.

In accordance with an embodiment of the present disclosure, the override condition further comprises a prohibited location, weather condition, or law enforcement request.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4 and 5 depict an example of maintaining an immutable ledger of the position of the drone of FIGS. 1-3.

DETAILED DESCRIPTION

Figure 1:
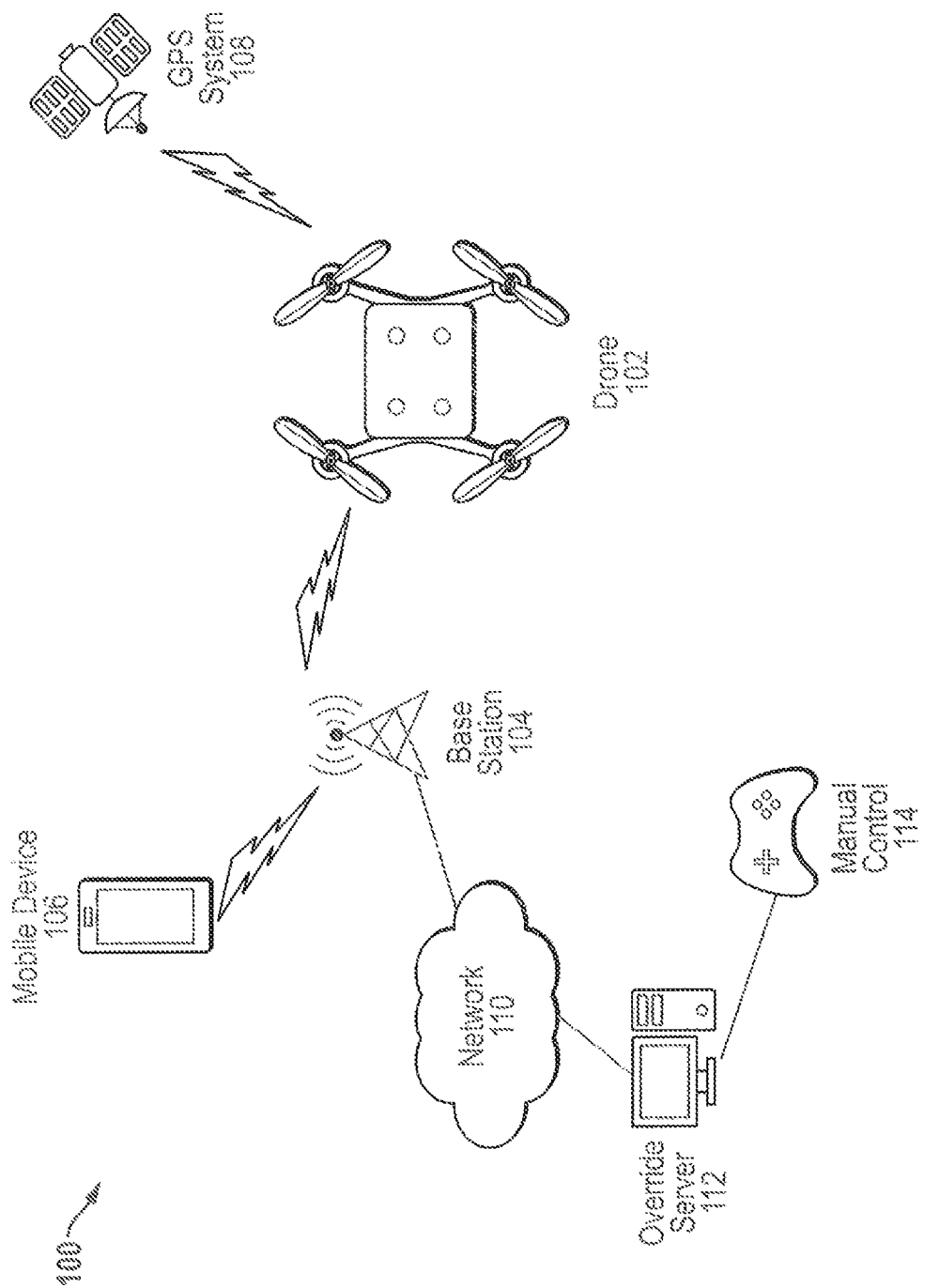
FIG. 1 is a system in accordance with an embodiment of the present disclosure.

Refer now in the drawings wherein depicted elements are, for the sake of clarity, not necessarily shown to scale and wherein like or similar elements are designated by the same reference numeral through the several views.

Turning to FIG. 1, an example of a system 100 that uses drone or UAV 102. Drones 102 (which can be fixed wing or rotary wing aircraft) are likely to find more widespread use in urban areas in which the cellular networks (e.g., 4G or Long-Term Evolution (LTE), 5G, or other next generation communications networks) are well-developed. As such, drone 102 can take advantage of the existing communications infrastructure to help ensure public safety and regulatory requirements. As shown in this example, the network 110 (which can be a switched packet network like the Internet) can be coupled to wireless base stations 104 that, themselves, can communicate with mobile devices 106 and drone 102. The drones 102, too, can receive global position system (GPS) data from the GPS system 108. Because of this configuration, an override server 112 (which can receive commands from a manual control 114) can control the operation of the drone under certain conditions, which are described in detail below.

Figure 2:
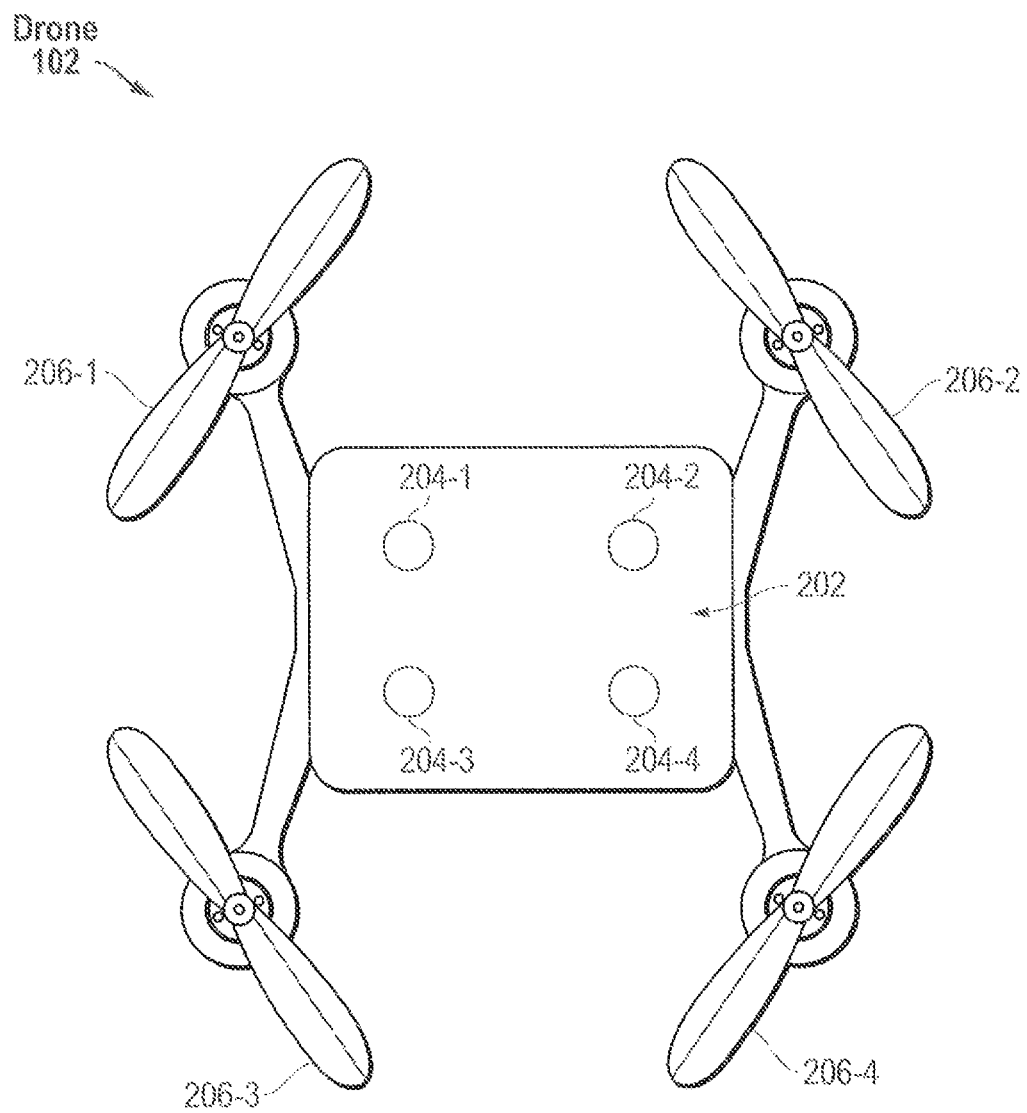
FIGS. 2 and 3 depict an example of the drone of UAV shown in FIG. 1.
Figure 3:
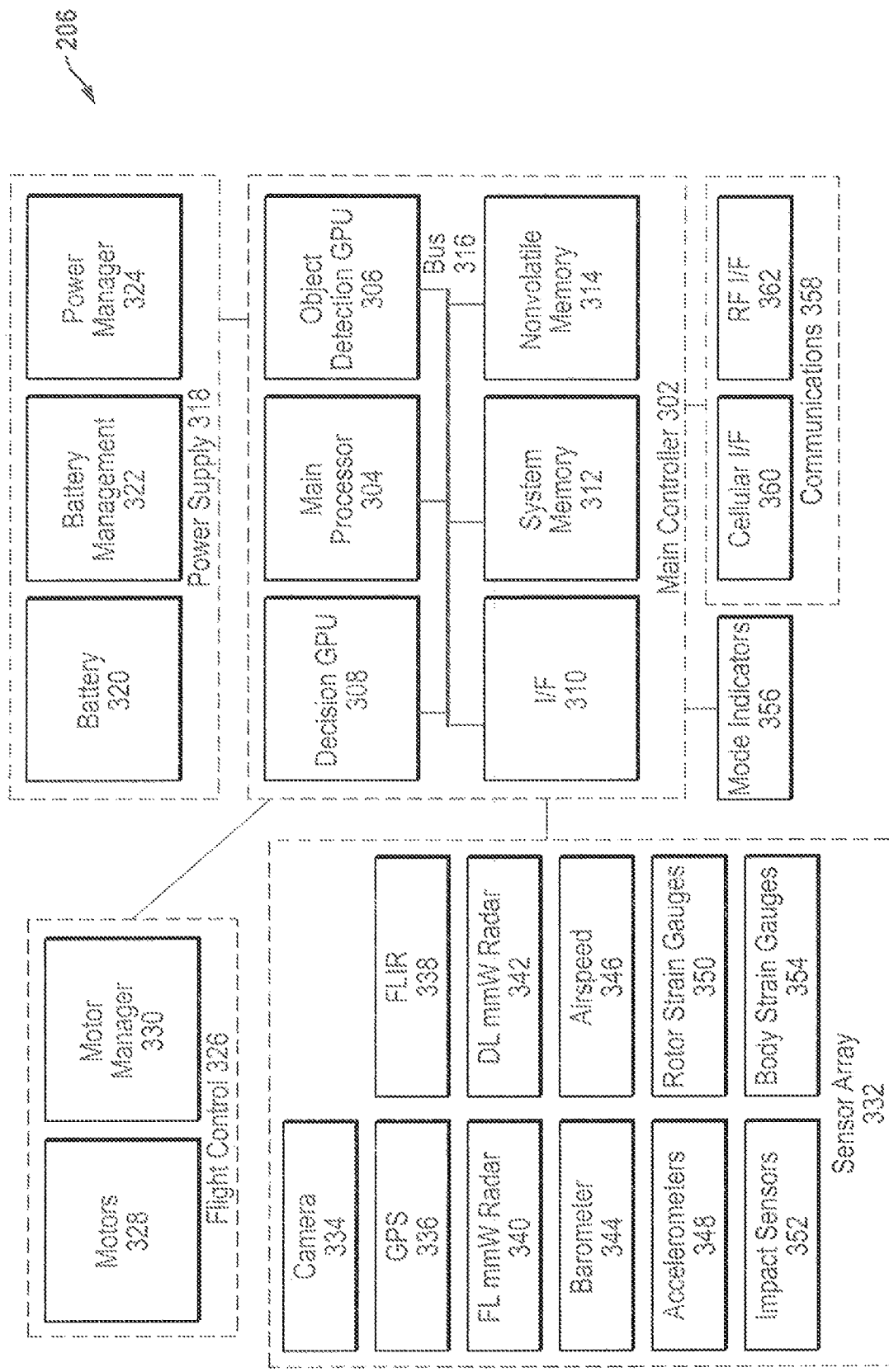

In FIGS. 2 and 3, a more detailed example of a drone of UAV 102 can be seen. As shown for the sake of simplicity in this example, the drone 102 is shown as being a quad-rotor (i.e., rotary wing) drone, but fixed wing drones or rotary wing drones with additional (or fewer) rotors is possible. Speaking strictly to the example shown, there is a main body with a housing 202 and four arms 206-1 to 206-4. Within each arm 206-1 to 206-4 and as is conventionally known, there is a motor (e.g. 328) with a stator secured to the housing and a rotor with a propeller secured thereto. This provides lift and flight control over the drone 102. The housing 202 can typically include a top surface with visual indicators 204-1 to 204-4. There may be fewer or more visual indicators 204-1 to 204-4, but, in this example, four indicators are shown. These indicators 204-1 to 204-4 are typically comprised of multi-color light-emitting diodes (LEDs) with diffusion lenses that enable the light to be seen from long distances (e.g., ½ mile or more). Depending on the mode of the drone (e.g., autonomous, hover, or remote-control) the indicators 204-1 to 204-4 (collectively referred to as mode indicators 356) can emit different colors (e.g., green for autonomous, yellow for hover, or red for remote-control), may be strobed differently (e.g., solid for autonomous, long pulses for hover, or short pulses for remote-control), or may be some combination of color and strobing.

Since the drone 102 is intended to have multiple modes (e.g., autonomous and remote-controlled), there can be certain controls and avionics employed within the drone 102. Typically, these controls and avionics take the form of a main controller 32, a communications module 358, power supply 318, flight control 326, and sensor array 332. Most of these components can be sensitive and can be secured within the interior of housing 202, but others—like some of the sensors—can be exteriorly or partially exteriorly mounted (like camera 334) or may have exposure through an aperture (e.g., airspeed sensor 346).

Turning first to the autonomous mode, the drone 102 can function in this mode with a variety of sensor inputs to allow it to follow a predetermined flightpath while also accounting for changing conditions. As shown in this example, the main controller 302 uses separate processors for observation, decisions, and interfacing. These processors 304, 306, and 308 are coupled to one another over a bus 316 (which may be a switch fabric, single bus, or multiple busses). In operation, it is desirable for the drone 102 to scan its surroundings during flight to detect objects (like other drones, powerlines, trees, birds, and so forth) and avoid these objects. The object detection processor 306 (which can be a graphics processing unit or GPU—like the Nvidia Jetson Tegra X2—or a tensor processing unit or TPU) is typically configured to do large scale matrix calculations (e.g., for hidden Markov models or conventional computer vision software) to detect an object that may be within the flight path of the drone 102. Sensor data can be provided to the processor 306 from the sensor array 332 through interface 210 (which itself is coupled to the bus 316 and which may be comprised of multiple interfaces). These sensors within the sensor array 332 can be on separate printed circuit boards (PCBs) or may be contained on the same PCB as the main controller 302. Typically, for object detection, a visual spectrum camera 334, infrared camera of forward-looking infrared (FLIR) camera 338, forward-looking millimeter wave (mmW) radar transceiver 340, downward-looking mmW radar transceiver 342 or any combination thereof can be used to perform object detection using processor 306. Similarly, the decision processor 308 (which can be a graphics processing unit or GPU—like the Nvidia Jetson Tegra X2—or a tensor processing unit or TPU) is typically configured to do large scale matrix calculations (e.g., for hidden Markov models) to predict collision and to predict avoidance. Using the known, predetermined flightpath, the processor 308 can predict the likelihood of a collision and alter the flightpath to avoid the collision while staying on course.

In contrast to processors 306 and 308, the main processor 304 can be an ordinary system-on-chip or SoC (e.g., Sitara-based SoC from Texas Instruments Incorporated). This processor 304 can be tasked with monitoring onboard telemetry, controlling the indicators 356, providing flight control, provide override control, and control communications. Typically, telemetry is collected through interface 310 from sensor in the sensor array 332. Usually, the airspeed sensor 346, barometer 344, impact sensors 352, GPS module 336, accelerometers 348, rotor strain gauges 350, and body strain gauges 354 provide telemetry. The barometer 344 can detect external dangers (e.g., weather) that may not be conducive for safe flight so as to reflect an internally detected override condition. The GPS module 336, airspeed sensor 346, and accelerometers 348 can detect relative position so as to maintain the correct flightpath and to reflect an internally detected override condition when deviations have exceeded predetermined thresholds. The impact sensor 352 and strain gauges 350 and 354 can be a measure of the internal health of the UAV 302 and can reflect an internally detected override condition when deviations have exceeded predetermined thresholds. In all modes, the main processor 304 can communicate flight controls to the motor manager 330 that controls the motors 328. The main controller 360 can also receive and transmit data and commands through the communications module 358 (which can include a cellular interface 260 and radio frequency (RF) interface 362). Other examples of internally detected override conditions can include processable events or scenarios by the decision processor 308 or sensor failure.

Typically, there is also memory (which can be comprised of volatile system memory 312 and nonvolatile memory 314). This memory can be the functional memory holding instructions for operation and may store data (such as the immutable ledger, predetermined flightpath, and maps) and working instructions. When the drone 102 is maintaining a predetermined flightpath, the main processor 304 can reference both maps and the flightpath stored in memory (e.g., nonvolatile memory 314). Data from the accelerometer 348, the airspeed sensor 346, and GPS module 336 can be used to determine relative position and velocity, which can be compared to the predetermined flightpath. From this, error data can be determined which allow the main processor 304 to implement course corrections.

Additionally, there is also a power supply 318. Because the drone 102 is electrically controlled and driven, management of the power distribution and of the batter 320 is generally important. The battery management module 322 can precisely manage the battery 320 and usage of the battery 320. Under conditions when the draw has exceeded predetermined thresholds or when the charge of the battery 320 is below a predetermined threshold, an internally detected override condition the battery management module 322 can direct appropriate responsive actions. Power distribution can be accomplished through the power manager 324, which can supply power to all internal components. The power supply 318 can also be separate or integrated with (same PCB as) the main controller 302.

Figure 4:
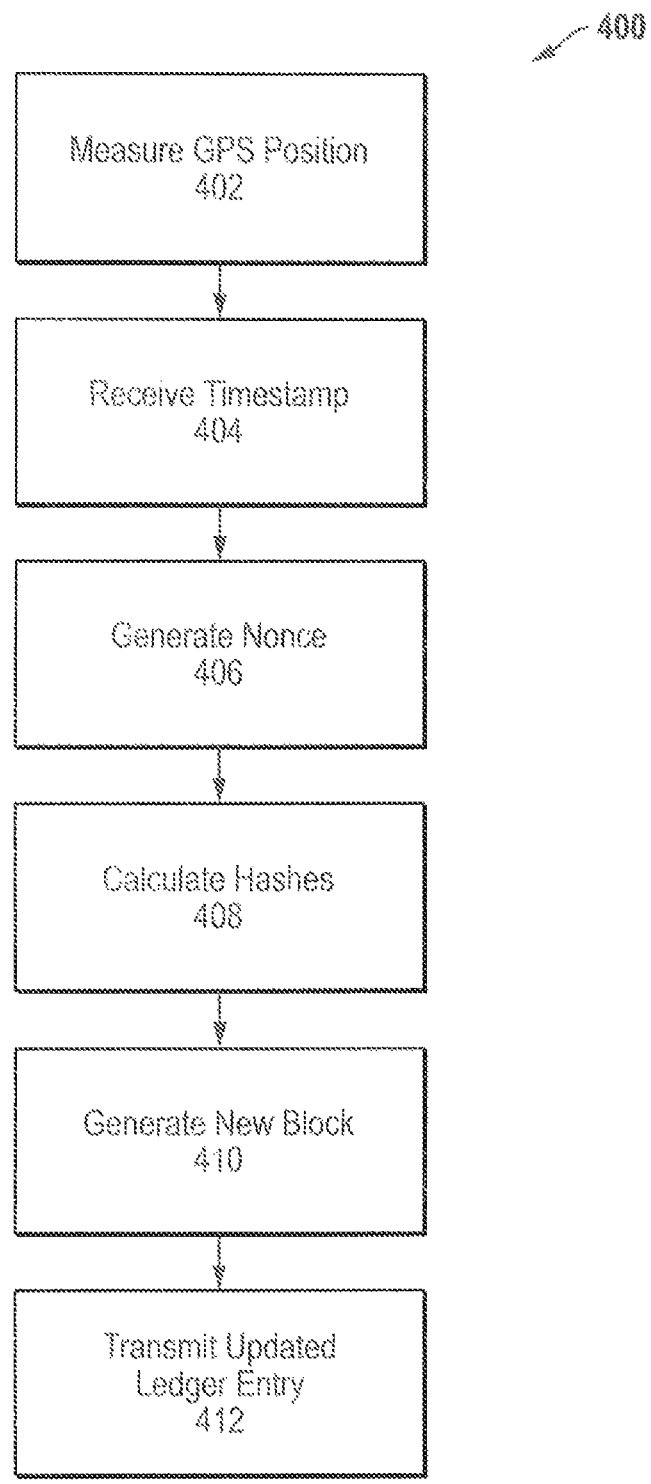

As part of the increased use of drones 202, it may become necessary as part of the regulatory scheme to maintain an immutable ledger of the location of drones 202. There can be a variety of reasons for this type of ledger, ranging from liability for damage caused by drones 202 or for law enforcement purposes. The immutable ledger can be accomplished using a blockchain such as a Merkel hash tree. Typically, as shown in FIGS. 4 and 5, a drone 102 will measure its GPS position in step 402 and receive generated a timestamp and nonce from network 110 in steps 404 and 406. From this data as well as the transaction number and drone identifier, hashes can be calculated in step 408. Typically, the top hash is, for example, calculated as follows:

(1) The degrees, minutes, and second of the GPS position latitude are (for example) concatenated with one another and double hashed with SHA-256;

(2) The degrees, minutes, and second of the GPS position longitude are (for example) concatenated with one another and double hashed with SHA-256;

(3) Each of the transaction number (which is typically a sequential number), the drone 102 identification number, the timestamp, and the nonce are (for example) double hashed with SHA-256; and (4) The hashes can then be concatenated with one another in a hash tree (double hashed at each stage) until the top hash is generated. Then, in step 410, a new block can be generated from previous block and top hash (e.g., concatenation and double SHA-265 hashing). The ledger (which can be in FIG. 5) can be updated and transmitted to the network 110.

Figure 6:
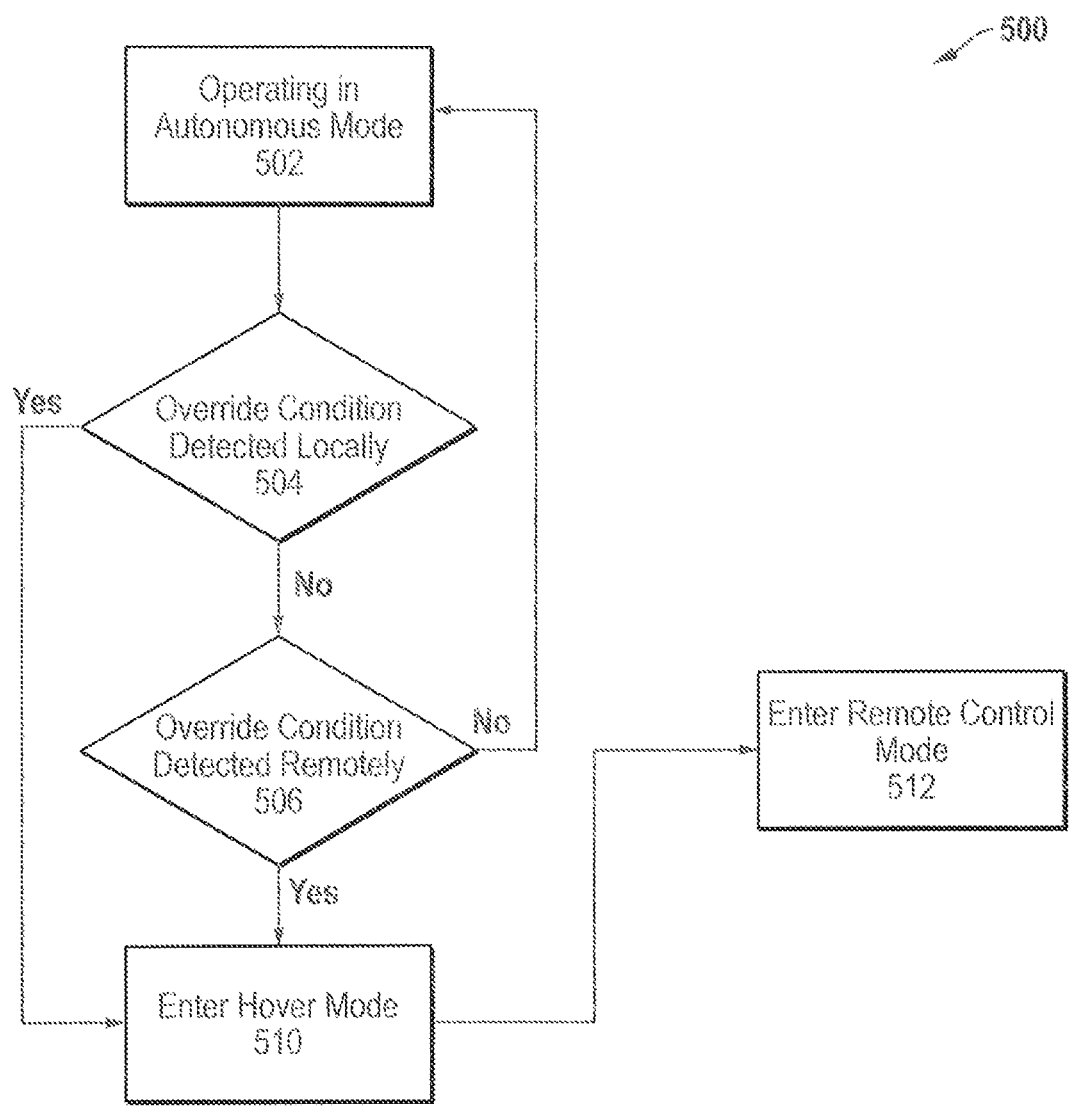
FIG. 6 depicts an example of the operation of the drone of FIGS. 1-3.

Turning now to FIG. 6, of other importance can be the override controls (which can be for safety of regulatory purposes). Typically, when a drone 102 is in flight, it is intended to operate between endpoints to operate in an autonomous mode in step 502. The autonomous mode is generally described above. While operating in autonomous mode, the main processor 304 will be engaged in substantially continuous condition monitoring. This is generally accomplished via monitoring of internally measured override conditions (which are discussed above) in step 504 or based on an externally measured override conditions in step 506. External override conditions can be triggered by a variety of external conditions, such as detecting that the drone has entered into an unauthorized area, unsafe weather conditions, or law enforcement request. In this case, the override server 112 (shown in FIG. 1) can send an override command to the drone 102 via network 110. When the override condition is present, the drone 102 enters into a hover mode (which changes the indicators 356 and where the drone 102 remains largely stationary) and indicates to the override server 112 that it is awaiting further instructions. In the case where the structural stability of the drone has been compromised (e.g., because of a bird strike), the alert to the network 110 from the drone 102 can allow law enforcement to be alerted to the danger and allow for human intervention through the manual control via cellular communications. This manual control can be accomplished when acknowledgement has been received by the drone 102 in step 512. At this point, the drone 102 enters remote-controlled mode (which changes indicators 356 and disables processors 306 and 308). It is also possible to switch directly from an autonomous mode to a remotely-controlled mode. Moreover, it may also be possible to return to autonomous mode if a problem is corrected in flight or during hover mode or if an obstacle is avoided through human intervention.

Having thus described the present disclosure by reference to certain of its preferred embodiments, it is noted that the embodiments disclosed are illustrative rather than limiting in nature and that a wide range of variations, modifications, changes and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention. Moreover, unless the term "means" is expressly used in the claims, no term is intended to be construed in accordance with 35 U.S.C. § 112(1).

The invention claimed is:

1. A method comprising:
   operating an unmanned aerial vehicle (UAV) in an autonomous mode;
   determining a position of the UAV with a global positioning system (GPS) module that is in communication with a main controller within the UAV;
   receiving a timestamp by a cellular module, wherein the cellular module is in communication with the main controller;
   generating a nonce;
   generating a Merkel root based at least in part on the timestamp and the position of the UAV;
   calculating a current block based at least in part on a previous block, the Merkel root, and nonce; and
   transmitting, via the cellular module, the current block, the timestamp, the nonce, the prior block, and the position of the UAV.

2. The method of claim 1, wherein the UAV further comprises a plurality of sensors.

3. The method of claim 2, wherein the plurality of sensors further comprises a camera and an accelerometer.

4. The method of claim 1, wherein the step of operating the UAV in the autonomous mode further comprises:
   determining a position of the UAV with the(GPS);
   comparing the position of the UAV with a predetermined course to generate error data; and
   determining a second course correction in response to the error data.

5. A UAV comprising:
   a lift body having:
      a first housing;
      a motor with a stator and a rotor, wherein the stator of the motor is secured to the first housing;
      a propeller that is secured to the rotor of the motor;
   a main body having:
      a second housing that is secured to the first housing and that has an interior;
      a visual indicator secured to the second housing;
      avionics secured at least partially within the interior of the second housing, wherein the avionics includes:
         a camera;
         a GPS module;
         a cellular module;
         an accelerometer;
         a power supply that is configured to provide power to the motor, the camera, the cellular module, the visual indicator, and the accelerometer;

a main controller having an object detection processor, a decision processor, and memory, wherein the main controller is configured to receive power from the power supply, and wherein the main controller is operable to communicate with the camera, the cellular module, the visual indicator, and the accelerometer, and wherein the memory includes instructions to:
operate the visual indicator to reflect that the UAV is in an autonomous mode;
analyze a first set of sensor data received from the camera to detect a location of a first object with the object detection processor during the autonomous mode;
determine a course adjustment with the decision processor based at least in part on the location of the first object during the autonomous mode;
operate the visual indicator to reflect that the UAV is in a hover mode when an override condition is present;
analyze a second set of sensor data received from the camera to detect a location of a second object with the object detection processor;
determine, with the decision processor, a distance from the second object from which the UAV is to hover, wherein the distance is based at least in part on the location of the second object;
operate the visual indicator to reflect that the UAV is in a remote-control mode;
transmit the third set of sensor data received from the camera via the cellular module; and
position the UAV in response to a flight control command received via the cellular module.

6. The UAV of claim 5, wherein the camera further comprises a visual spectrum camera and an infrared camera.

7. The UAV of claim 5, wherein the avionics further comprises a forward-looking millimeter wave (mmW) radar transceiver, and a downward-looking mmW radar tranceiver, and wherein the first, second, and third sets of sensor data include measurements from the forward-looking and downward-looking mmW radar tranceivers.

8. The UAV of claim 5, wherein the avionics further comprises an airspeed sensor and a barometer, and wherein, for the instructions to determine the course adjustment, the course adjustment is at least in part based on airspeed.

9. The UAV of claim 5, wherein the avionics further comprises impact sensors that are configured to be powered by the power supply and that is in communication with the main controller.

10. The UAV of claim 5, wherein the visual indicator is a plurality of LEDs, and wherein the first, second, and third modes are represented by different colors.

11. The UAV of claim 5, wherein the first housing further comprises a plurality of first housings, and wherein the motor further comprises a plurality of motors, with the stators of each secured at least of the first housings, and wherein the propeller further comprises a plurality of propellers with each secured to at least one rotor of at least one of the motors.

12. A UAV comprising:
a lift body having:
a plurality of arms;
a plurality of motors, wherein each motor has a stator and a rotor, and wherein the stator of each motor is secure to at least one of the arms;
a plurality of propellers, wherein each propeller is secured to at least one rotor of at least one of the motors;
a main housing having an interior, a top surface, and a bottom surface, wherein each first arm of the plurality of arms is secured to the main housing;
a power supply secured within the interior of the main body housing, wherein the power supply includes:
a battery; and
a power supply manager that is electrically coupled to the battery;
a motor manager that is secured with the interior of the main body and that is electrically coupled to the power supply and each motor;
a plurality of visual indictors that are secured to the main housing such that each visual indicator is visible from the top surface of the main housing;
a camera that is secured to the bottom surface of the main housing and that is electrically coupled to the power supply;
a mmW radar transceiver secured to the main housing and that is electrically coupled to the power supply;
a GPS module secured to the main housing and that is electrically coupled to the power supply;
an accelerometer that is secured to the main housing and that is electrically coupled to the power supply;
a cellular module that is secured to the main housing and that is electrically coupled to the power supply; and
a main controller that is secured within the interior of the main housing, wherein the main controller includes:
a bus;
a object detection processor that is electrically coupled to the bus;
a decision processor that is electrically coupled to the bus;
an interface that is electrically coupled to the bus, wherein the interface is electrically coupled to the camera, mmW radar transceiver, GPS module, accelerometer, and cellular module; and
memory that is electrically coupled to the bus, wherein the memory includes instructions to:
operate the visual indicators to reflect that the UAV is in an autonomous mode;
analyze a first set of sensor data received from the camera and mmW radar transceiver to detect a location of a first object with the object detection processor during the autonomous mode;
determine a course adjustment with the decision processor based at least in part on the location of the first object during the autonomous mode;
operate the visual indicators to reflect that the UAV is in a hover mode when an override condition is present;
analyze a second set of sensor data received from the camera and mmW radar transceiver to detect a location of a second object with the object detection processor;
determine, with the decision processor, a distance from the second object from which the UAV is to hover, wherein the distance is based at least in part on the location of the second object;
operate the visual indicator to reflect that the UAV is in the remote-control mode;
transmit the third set of sensor data received from the camera via the cellular module; and
position the UAV in response to a flight control command received via the cellular module.

13. The UAV of claim 12, wherein the camera further comprises a visual spectrum camera and an infrared camera.

14. The UAV of claim 13, wherein the mmW radar transceiver further comprises a forward-looking mmW radar transceiver and a downward-looking mmW radar transceiver.

15. The UAV of claim 14, wherein the UAV further comprises an airspeed sensor and a barometer, and wherein, for the instructions to determine the course adjustment, the course adjustment is at least in part based on airspeed.

16. The UAV of claim 15, wherein the override condition further comprises a prohibited location, weather condition, or law enforcement request.

\* \* \* \* \*

UNITED STATES PATENT AND TRADEMARK OFFICE
CERTIFICATE OF CORRECTION

Page 1 of 1

PATENT NO. : 10,759,534 B2
APPLICATION NO. : 16/176644
DATED : September 1, 2020
INVENTOR(S) : George A. Miller It is certified that error appears in the above-identified patent and that said Letters Patent is hereby corrected as shown below:

In the Specification

On Column 7, Line 15, "Merkel" should read --Merkle--.
On Column 8, Line 31, "Merkel" should read --Merkle--.
On Column 8, Line 34, "Merkel" should read --Merkle--.

Signed and Sealed this
Ninth Day of July, 2024

Katherine Kelly Vidal
*Director of the United States Patent and Trademark Office*